United States Patent [19]

Takenaka

[11] Patent Number: 5,321,526
[45] Date of Patent: Jun. 14, 1994

[54] WHITE LEVEL DETECTION CIRCUIT FOR AN OPTICAL IMAGE READER

[75] Inventor: Shinya Takenaka, Osaka, Japan

[73] Assignee: Sumitomo Electric Industries, Ltd., Osaka, Japan

[21] Appl. No.: 852,945

[22] Filed: Mar. 17, 1992

[30] Foreign Application Priority Data

Mar. 26, 1991 [JP] Japan .................. 3-061889

[51] Int. Cl.⁵ .............................. H04N 1/40
[52] U.S. Cl. .................... 358/464; 358/462
[58] Field of Search .................. 382/50, 52, 53; 358/163, 213.27, 464, 462, 467, 450, 455, 456, 458; H04N 1/40, 5/14

[56] References Cited

U.S. PATENT DOCUMENTS

| 4,234,867 | 11/1980 | Butin | 382/53 |
| 4,481,666 | 11/1984 | Niwa | 358/53 |
| 4,486,781 | 12/1984 | Wilmer et al. | 358/163 |
| 4,680,624 | 7/1987 | Murakami | 358/163 |
| 4,811,101 | 3/1989 | Yagi | 358/171 |
| 4,829,379 | 5/1989 | Takakai | 358/163 |
| 5,060,083 | 10/1991 | Ueno | 358/464 |

FOREIGN PATENT DOCUMENTS

| 34719 | 3/1980 | Japan | G06K 9/38 |
| 58-34676 | 3/1983 | Japan . | |
| 168385 | 10/1983 | Japan | H04N 1/40 |
| 137683 | 6/1987 | Japan | G06K 9/20 |
| 195981 | 8/1987 | Japan | H04N 1/40 |
| 31978 | 2/1992 | Japan | G06F 15/70 |
| 1527600 | 10/1978 | United Kingdom . | |

Primary Examiner—James J. Groody
Assistant Examiner—Glenton B. Burgess
Attorney, Agent, or Firm—Cushman, Darby & Cushman

[57] ABSTRACT

In the white level detection circuit for an optical image reader, for a low value portion in an image, the white level signal corresponding to an image signal of a high value background portion which precedes to the low value portion is held steady. Accordingly, even if the low value image portion has a long duration, the white level signal may be kept at a proper value for the image signal corresponding to the low value image signal. For the high value background portion, the white level signal that immediately follows a variation of the image signal can be obtained. Therefore, a proper white level signal can be generated for the background portion. Various processing applied to the image signal on the basis of the white level signal may be performed in a satisfactory manner. As a consequence, the read performance of the optical image reader may be remarkably improved.

5 Claims, 6 Drawing Sheets

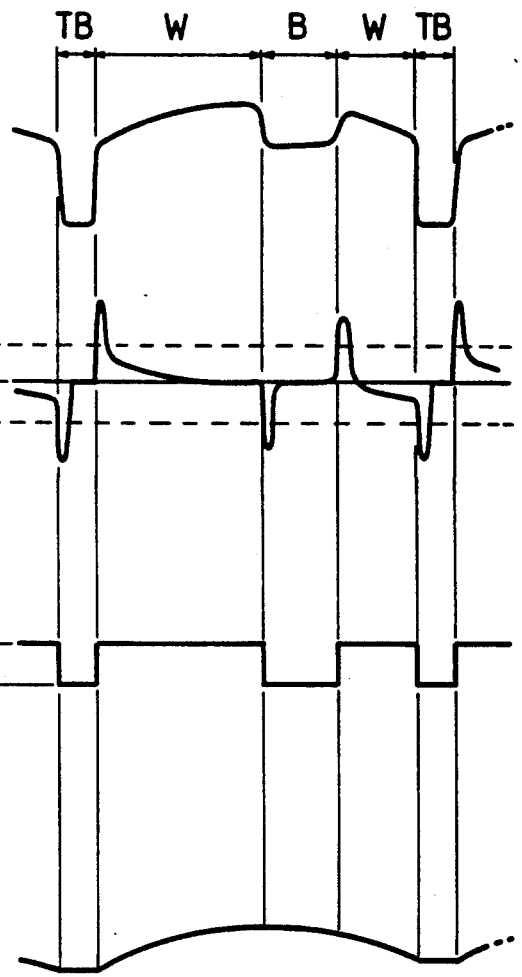
FIG. 8(a) IMAGE SIGNAL
PRIOR ART
FIG. 8(b) OUTPUT SIGNAL OF DIFFERENTIATION CIRCUIT
PRIOR ART
FIG. 8(c) OUTPUT SIGNAL OF FLIP-FLOP
PRIOR ART
FIG. 8(d) WHITE LEVEL SIGNAL
PRIOR ART

WHITE LEVEL DETECTION CIRCUIT FOR AN OPTICAL IMAGE READER

BACKGROUND OF THE INVENTION

1. Field of the Invention

The present invention relates to a white level detection circuit for an optical image reader, such as an optical character reader (OCR), a bar code reader or an image scanner.

2. Description of the Prior Art

An optical image reader is known which optically reads an image by using opto-electric transducing elements, such as image sensors and photo diodes, and processes image data generated by those elements. An optical character reader (OCR) and a bar code reader are examples of this type of optical image reader. An image signal output from an image sensor is converted into binary image data. The binary image data is processed for recognizing characters and bar codes. It is common practice that image data is processed on the basis of a white level (signal level) corresponding to a background portion of high value (e.g., white color) in the image.

The white level may not be uniform over the image for various reasons, such as nonuniformity of an illuminating light source, deterioration of the efficiency of an imaging lens around the fringe of the image by the $\cos^4$ rule, the quality of paper bearing the image data and dirt on the surface of the paper. To accurately reproduce an image, it is necessary to accurately know the white level, which varies with location, on the image.

A basic construction of a white level detection circuit thus far employed in a bar code reader, for example, is shown in FIG. 4. The white level detection circuit is essentially a peak hold circuit. An output signal of an image sensor constituting an input image signal is applied through a buffer amplifier 1 and a diode 2 to a capacitor 3. The capacitor 3 is charged with the image signal, and discharged through a resistor 4. A potential appearing at the terminal of the capacitor 3 provides a white level signal, by way of a buffer amplifier 5.

FIG. 5 is a diagram showing a waveform useful in explaining the operation of the white level detection circuit of FIG. 4. The image signal is represented by a curve L1, and the white level signal by a curve L2. Consider the simple case of a black bar code formed on white paper. A white period W corresponds to a white portion in the image, and a black period B, to a black portion (i.e., black bar). A period TB indicates a blank period of the image sensor. When the image signal increases, the capacitor 3 is charged through the diode 2. When the image signal decreases, the capacitor 3 is discharged at a preset time constant, through the resistor 4. When a point being read changes from black to white, the image signal sharply rises and capacitor 3 charges through the diode 2. As a result, during the white period W, a white level signal, equal to the image signal, is output. When the point being read changes from black to white, the image signal sharply falls. Capacitor 3 discharges thereby maintaining the image signal substantially equal to the value during the previous white period W. Changes in the white level, which are due to changes of value or brightness in the white portion on the paper, are subtle. Accordingly, when the white level on the paper falls, the white level signal accurately follows the fall of the white level.

In the prior art, if a relatively long black portion exists, a long black period BL appears, as shown in FIG. 6. In this situation, the discharge of the capacitor 3 is completed by the end of the long black period BL. The white level signal (indicated by curve L2) falls to approach to the level of the image signal corresponding to the black portion as shown by reference character al. When the image signal is processed on the basis of such a white level signal, the black portion may be mistakenly recognized as the white portion. Although a mistake in recognition in which the white portion is recognized as the black portion or vice versa would never occur, the image signal of the black portion is increased in comparison to the white level signal, resulting in distortion of the recognized image. The distortion adversely affects the bar code discriminating processing, which includes binary processing.

One approach to solving this problem would be to sufficiently increase the discharge time-constant defined by the capacitor 3 and the resistor 4. This approach, however, may result in the failure of the white level signal to follow the natural fall of the white level on paper.

An arrangement which solved the problem of distorted images, is shown in FIG. 7. The arrangement includes a peak hold circuit 11 which has a variable discharge time-constant. The discharge time constant of the peak hold circuit 11 is selectively changed by a switch circuit 12 which selects a short time constant for the white portion and a long time constant for the black portion. The peak hold circuit 11 includes a capacitor, a diode for charging the capacitor, and a resistor for discharging the capacitor.

An image signal is applied to peak hold circuit 11 and to differentiation circuit 13. A derivative or differential coefficient produced by differentiation circuit 13 is compared to proper threshold levels TH1 and TH2 (TH1 > 0 > TH2) in comparator circuit 14. The output signal of comparator circuit 14 is applied to flip-flop 15 as either set signal S or reset signal R,. thereby controlling switch circuit 12. Switch circuit 12 is rendered conductive or nonconductive depending on the state of flip-flop 15, thereby selecting the discharge time constant of the peak hold circuit 11 to be either short or long, respectively.

FIGS. 8(a) through 8(d) are diagrams showing waveforms useful in explaining the operation of the prior art circuit of FIG. 7. FIG. 8(a) shows an image signal waveform. FIG. 8(b) shows a waveform of the corresponding output signal of differentiation circuit 13. FIG. 8(c) shows a waveform of the resulting output signal of flip-flop 15. FIG. 8(d) shows the resultant output waveform of white level signal from peak hold circuit 11.

The image signal changes sharply at the start and end points of blank period TB and black period B. Pulse signals having polarity based on changes in the image signal, are output from differentiation circuit 13. When the signal is processed from blank period TB to white period W, and from black period B to white period W, the output signal of differentiation circuit 13 becomes a large positive signal, exceeding threshold level TH1. As a result, the comparator circuit 14 produces a set signal S, setting the flip-flop 15, which in turn produces an output signal of logic "1". Consequently, switch circuit 12 selects a short discharge time constant of peak hold circuit 11. Accordingly, during period W, the white level signal accurately follows the change of the image signal.

When the signal is processed from white period W to either blank period TB or black period B, the output signal of differentiation circuit 13 is negative in polarity, falling below threshold value TH2. As a result, reset signal R is derived from comparator circuit 14, and resets the flip-flop 15 which in turn produces an output signal of logic "0". In response, switch circuit 12 selects a large discharge time-constant of the peak hold circuit 11. As a result, even if black period B is long, the white level signal can substantially maintain its value from the end of the previous white period. Accordingly, the black portion will not be mistaken for the white portion because the image distortion caused when the image signal in the black portion increases relative to the white level signal has been eliminated.

However, this prior art is not problem-free. When the white level on the paper surface falls during a long black period B, a proper white level signal cannot be obtained during the subsequent white period. This problem will be further described below with respect to FIGS. 9(a) and 9(b).

If, as shown in FIG. 9(a), the white level on the read surface increases by $\Delta w1$ during the long black period BL1, peak hold circuit 11 immediately increases the white level signal which follows the image signal variation, during the white period W following the black period BL1. To the contrary, if as shown in FIG. 9(b), the white level on the read surface decreases by $\Delta w2$ during the long black period BL2, peak hold circuit 11 cannot immediately follow a variation of the decreased image signal during the white period W after the black period BL2. Rather, it slowly follows the variation of the decreased image signal at a time constant. As a result, during the white period W following black period BL2, a white level signal which is higher than the actual white level is output because image signal input during the white period W after the black period BL2 is lower than the white level signal retained in peak hold circuit 11 and cannot actively charge the capacitor in peak hold circuit 11. In other words, the circuit, out of necessity, waits until completion of the discharge of the capacitor with a time constant, in order that the white level signal changes after the image signal changes. Otherwise, when the white level signal is improper during the white period W, the white image is distorted.

A similar problem also arises when the white level of the image changes at the start point and the end point of the image scanning period. When the white level of the image signal at the start point of the scan period is higher than the white level at the end point by $\Delta w$, as shown in FIG. 10, the white level signal retained during blank period TB cannot immediately follow the image signal variation in the leading portion of the white period subsequent to blank period TB. As a result, as in the above case, the image in the white portion is distorted.

Accordingly, an object of the present invention is to provide a white level detection circuit for an optical image reader which produces a white level signal that accurately follows a variation of the white level on the surface, and produces a white level signal that allows for excellent processing of the image signal corresponding to the black portion.

SUMMARY OF THE INVENTION

A white level detection circuit is used for an optical image reader in which light reflected from a read surface is converted into an electrical image signal by opto-electric transducing means, and the image is read on the basis of the resulting image signal. The white level is detected as the image signal level corresponding to a background portion of high value in the image. The white level detection circuit comprises a sample/hold means for receiving the image signal from the opto-electric transducing means and then producing a white level output signal. The operation mode of the sample/hold means is switched, in response to an external control signal between a sample mode in which the sample/hold means produces a signal following a variation of the image signal, and a hold mode in which the sample/hold means produces a signal at a fixed level corresponding to the image signal level of the previous sample mode. The detection circuit also comprises a control means for generating a control signal which places the sample/hold means in the sample mode when the opto-electric transducing means output signal greatly increases or the hold mode when the opto-electric transducing means output signal greatly decreases.

When a point on the read surface shifts from an image portion of low value to a background portion of high value, the output signal of the opto-electric transducing means sharply increases. In response, the sample/hold means is placed in a sample mode. In the sample mode, the sample/hold means produces a signal (e.g., an image signal per se) following a variation of an image signal in the form of a white level signal. Accordingly, it generates an accurate white level signal corresponding to the background portion when the image signal either rises or falls. Thus, the processing of the image signal of the background portion based on the white level signal, can be accurately performed.

When a point shifts from a background portion of high value to an image portion of low value, the output signal of the opto-electric transducing means sharply decreases. In response, the sample/hold means is placed in a hold mode. In the hold mode, the white level signal held remains unchanged in level over the entire period of the hold mode. Therefore, even when the image portion of low value persists, the white level signal remains unchanged. The signal corresponding to the image portion of low value can be processed while remaining free from image distortion.

The sample/hold means can accurately follow a continuous variation of the image signal, but it does not follow a discontinuous or extremely steep variation of the image signal detected by the differentiation circuit. Therefore, depending on the sharp increase or the sharp decrease of the image signal, the white level changes with the image signal. Thus, when no image signal is present, and the image signal comes in and first rises, the white level is incorrect for an instant, but it follows the image signal level in the sample mode during one scan operation, and once the white level is corrected, it accurately follows the image signal level variation. Therefore, the instantaneous incorrect white level state is negligible in practical use.

In the white level detection circuit of another embodiment, the control means includes a differentiating means for detecting a derivative of the opto-electric transducing means output signal, a comparing means for comparing the differentiating means output signal with a positive first threshold level and a negative second threshold level, respectively. The comparing means produces a set signal when the output signal of the differentiating means exceeds the first threshold level, and a reset signal when the output signal of the differentiating means falls below the second threshold level. The control means also comprises a hold means for placing the sample/hold means in the sample mode in response to the set signal from the comparing means, and for placing the sample/hold means in the hold mode in response to the reset signal from the comparing means.

Therefore, the differentiating means can detect a sharp increase or a sharp decrease of the image signal. The comparing means compares a derivative of the image signal output from the differentiating means with the first or the second threshold level. The increase or decrease of the image signal is determined during the comparing operation. The first threshold level takes a positive value. The derivative, when it exceeds the first threshold level, indicates the steep increase of the image signal. Subsequent to the increase of the image signal, the point to be read is present in the background portion of high value. At this time, the comparing means produces a set signal. In response to the set signal, the hold means outputs and holds a control signal placing the sample/hold means in a sample mode which then produces a white level signal following the image signal for the background portion of high value.

The second threshold level takes a negative value. The derivative detected by the differentiating means, when it falls below the second threshold level, indicates the steep decrease of the image signal. Subsequent to the image signal decrease, the point to be read is present in the image portion of low value. At this time, the comparing means produces a reset signal, and the hold means outputs and holds a control signal placing the sample/hold means in a hold mode for the low value image portion.

BRIEF DESCRIPTION OF THE DRAWINGS

FIGS. 8(a)–8(d) are a diagram showing a set of waveforms useful in explaining the operation of the prior art circuit.

DESCRIPTION OF THE PREFERRED EMBODIMENT

A preferred embodiment of the present invention will described with reference to the accompanying drawings.

Figure 1:
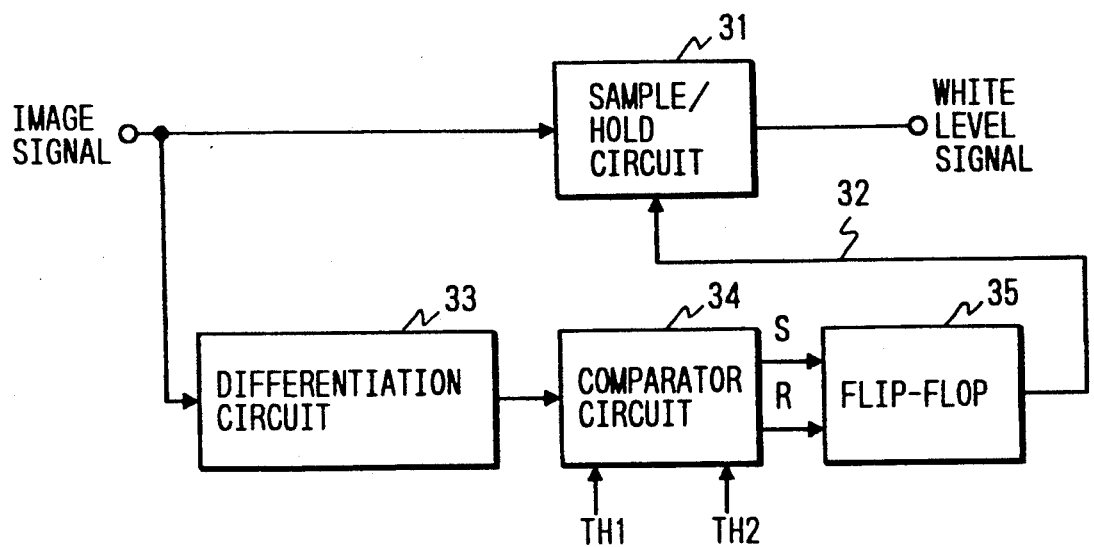
FIG. 1 is a block diagram showing the basic arrangement of a white level detection circuit for an optical image reader according to a preferred embodiment of the present invention.

FIG. 1 is a block diagram showing the basic arrangement of a white level detection circuit for an optical image reader according to a preferred embodiment of the present invention. The white level detection circuit is used for an optical image readers, such as a bar code reader or an optical character reader. Optical image readers are, in turn, used for reading images on white paper surfaces, upon which black bar codes and characters are formed. The white level detection circuit detects the image signal which corresponds to the white portion of the surface as the background and is read in the form of a white level. The image signal is obtained, when the paper surface is illuminated with light and the reflected light is converted into an electrical signal by an opto-electric transducing element, an example of which comprises an image sensor and photo diodes.

An image signal derived from the opto-electric transducing element is applied to sample/hold circuit 31. Under control of a control signal from line 32, the sample/hold circuit 31 is operable in either of two modes: a sample mode in which it produces a signal following an image signal variation or a hold mode in which it holds, i.e., maintains, the signal level from the previous sample mode. The output image signal of sample/hold circuit 31 is used as a white level signal. The binary processing of the image signal and the discriminating processing for characters and bar codes are performed on the basis of the white level signal.

The image signal from the opto-electric transducing element is also applied to differentiation circuit 33 for detecting the derivative or differential coefficient of the image signal. Differentiation circuit 33 produces a positive signal when it receives the leading edge of the image signal, and a negative signal when it receives the trailing edge. The amplitude of the differentiation circuit output signal depends on the rate of change of the image signal.

The output signal of differentiation circuit 33 is applied to comparator circuit 34 where it is compared with a positive first threshold level TH1 and a negative second threshold level TH2 (TH1>0>TH2), respectively. When the output signal of differentiation circuit 33 is higher than the first threshold TH1, the comparator circuit 34 produces a set signal S. When it is lower than the second threshold level TH2, the circuit produces a reset signal R.

The set signal S and the reset signal R output from comparator circuit 34 are applied to RS (set/reset)-flip-flop 35. Flip-flop 35 is set by the set signal S from comparator circuit 34, and transmits a signal logic "1" onto the line 32. The flip-flop is reset by the reset signal R, and transmits a signal logic "0" onto the line 32.

The signal from the flip-flop 35 is applied as a control signal to sample/hold circuit 31. When the logic "1" signal is derived onto the line 32, sample/hold circuit 31 is placed in the sample mode. When the logic "0" signal is derived onto the line 32, sample/hold circuit 31 is placed in the hold mode. Differentiation circuit 33, comparator circuit 34, and flip-flop 35 make up a control means for the detection circuit.

Figure 2:
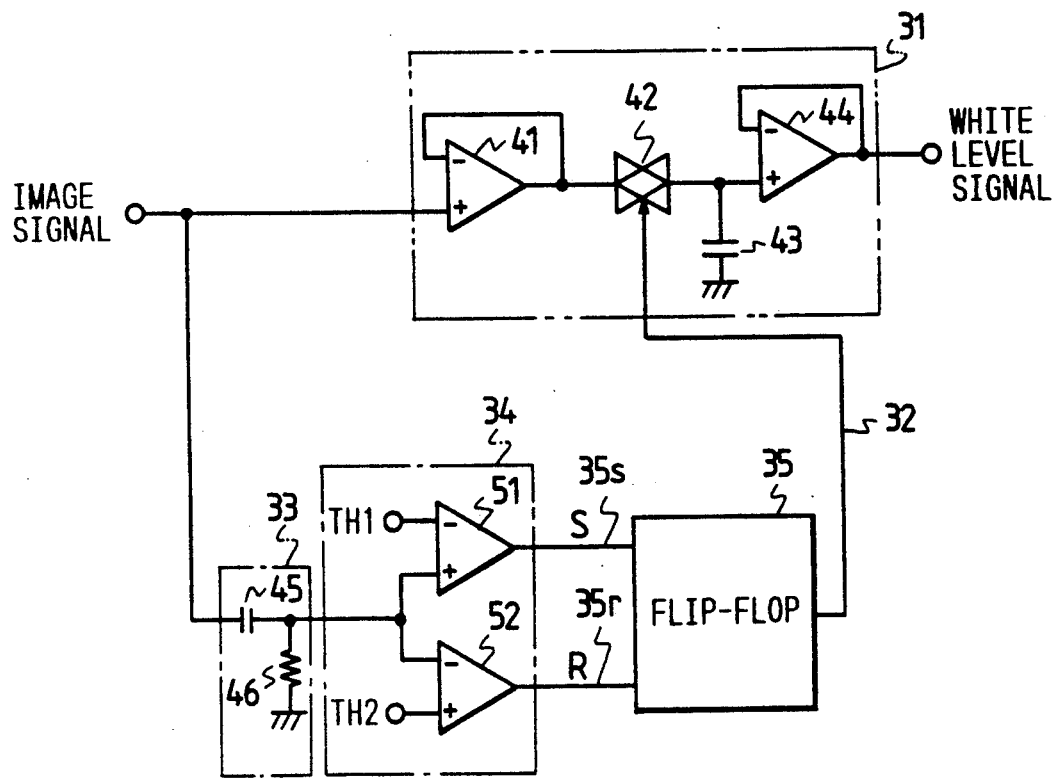
FIG. 2 is a circuit diagram showing the detailed arrangement of the white level detection circuit.

FIG. 2 is a circuit diagram showing a detailed arrangement of the white level detection circuit according to a preferred embodiment of the present invention.

Sample/hold circuit 31 is made up of input buffer 41, analog switch 42 for switching an image signal applied through input buffer 41, capacitor 43 for holding the signal applied through analog switch 42, and output buffer 44. A potential appearing at the terminal of capacitor 43, which is connected to analog switch 42, is derived as a white level signal through output buffer 44. The control signal from the line 32 is connected to the gate of analog switch 42. Through the switching operation of analog switch 42, the operation of the sample/-hold circuit 31 can be switched from the sample mode to the hold mode, or vice versa.

When analog switch 42 is conductive, the signal derived from output buffer 44 corresponds directly to the image signal, and, accordingly, the sample mode is set up. When analog switch 42 is nonconductive, the signal applied through analog switch 42 is held in capacitor 43 immediately before the switch is turned off, and the hold mode is set up.

Differentiation circuit 33 consists of capacitor 45 and resistor 46. When the output impedance of the pre-stage of differentiation circuit 33 is high, an input buffer is preferably provided at the input of the differentiation circuit.

Comparator circuit 34 includes comparators 51 and 52. The inverting input terminal of comparator 51 receives the first threshold level THI, and the noninverting input terminal thereof receives an output signal of differentiation circuit 33. A high level signal output from comparator 51 serves as the set signal. The comparator 52 receives the output signal of the differentiation circuit 33 at the inverting input terminal, and the second threshold level TH2 at the noninverting input terminal. The high level signal output from comparator 52 serves as the reset signal R. The output signal of comparator 51 is applied to the set input terminal 35s of flip-flop 35. The output signal of comparator 52 is applied to the reset input terminal 35r of flip-flop 35. If flip-flop 35 is constructed with two NAND gates, as the case may be, the input of the flip-flop must be the negative logic signal "0".

Figure 3:
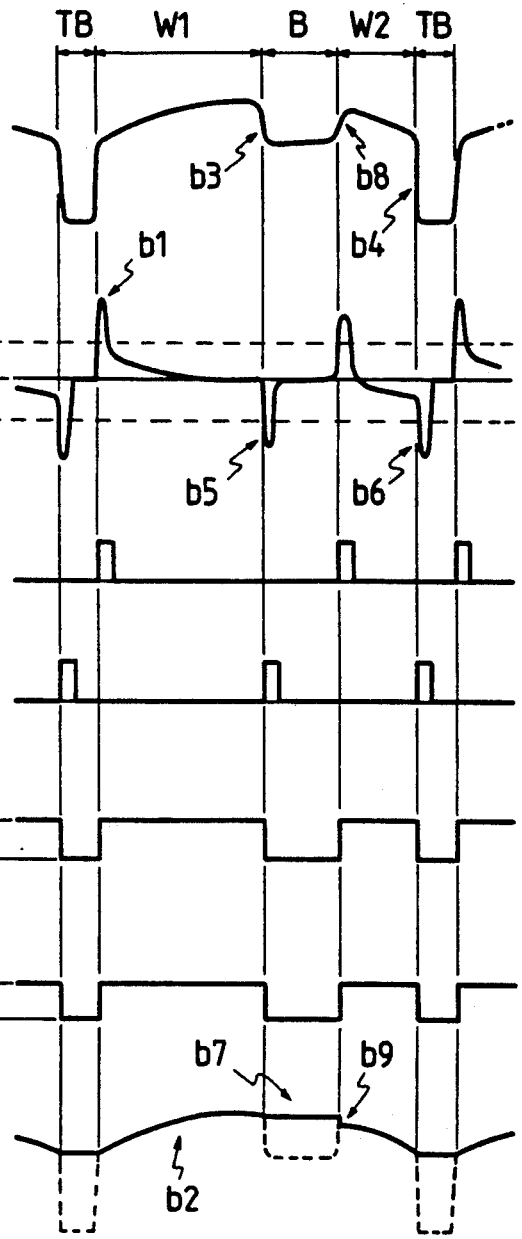
FIG. 3a–3b are timing chart useful in explaining the operation of the white level detection circuit.
Figure 4:
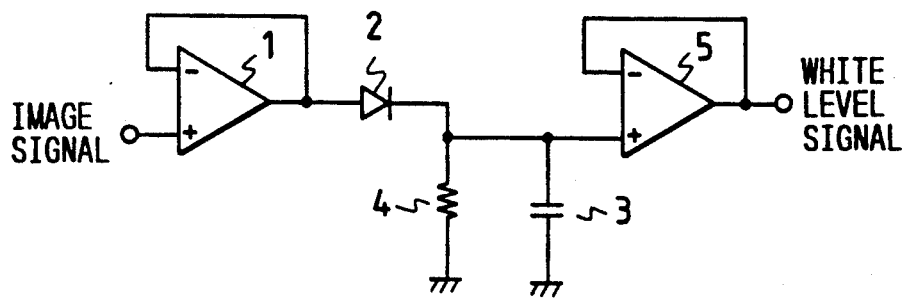
FIG. 4 is a circuit diagram showing the basic construction of a conventional white level detection circuit.
Figure 5:
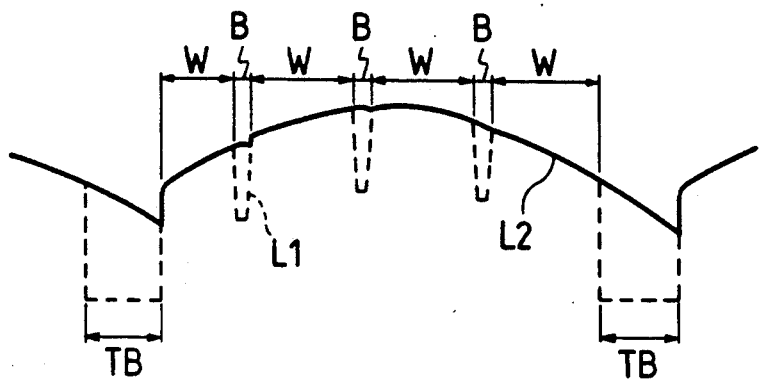
FIG. 5 is a diagram showing a waveform useful in explaining the operation of the white level detection circuit thus arranged.
Figure 6:
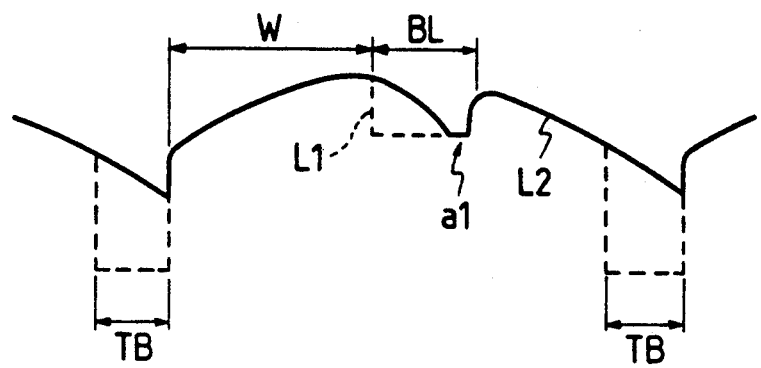
FIG. 6 is a diagram showing a waveform for explaining the problem of the prior art white level detection circuit.
Figure 7:
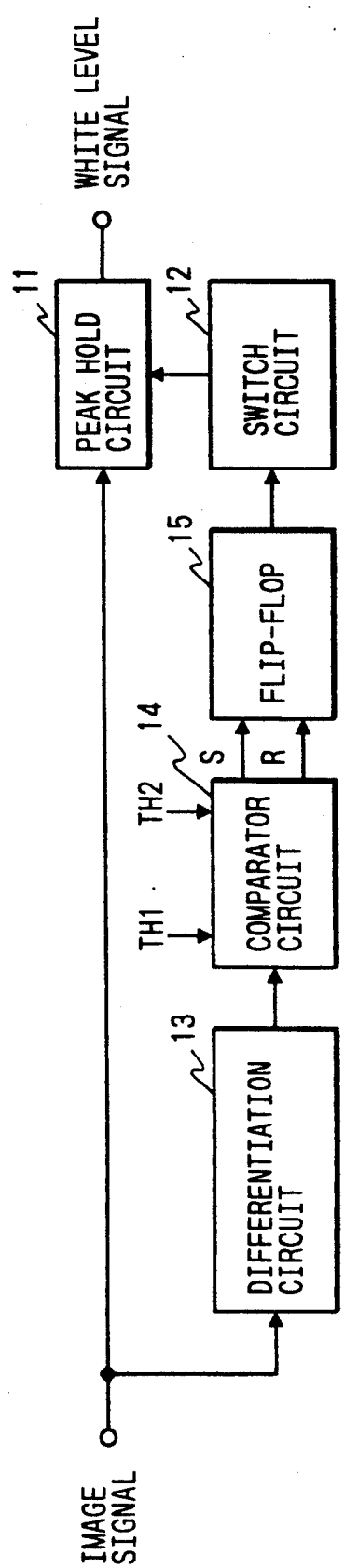
FIG. 7 is a block diagram showing prior art.
Figure 9A:
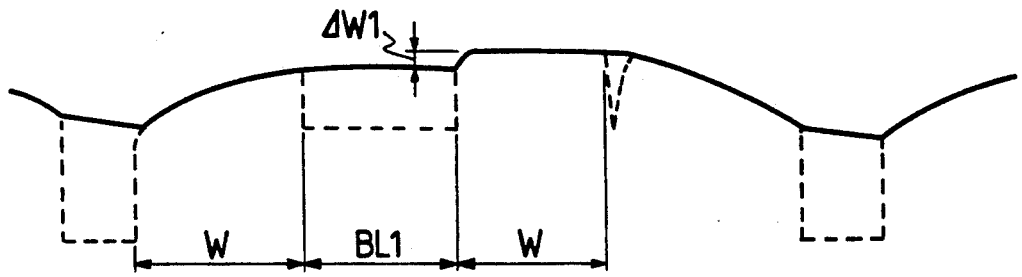
FIGS. 9(a) and 9(b) are waveform diagram for explaining a problem of the prior art.
Figure 9B:
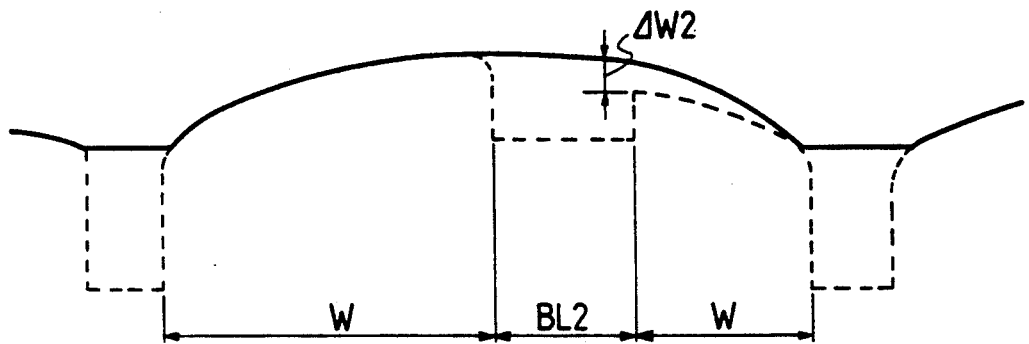
Figure 10:
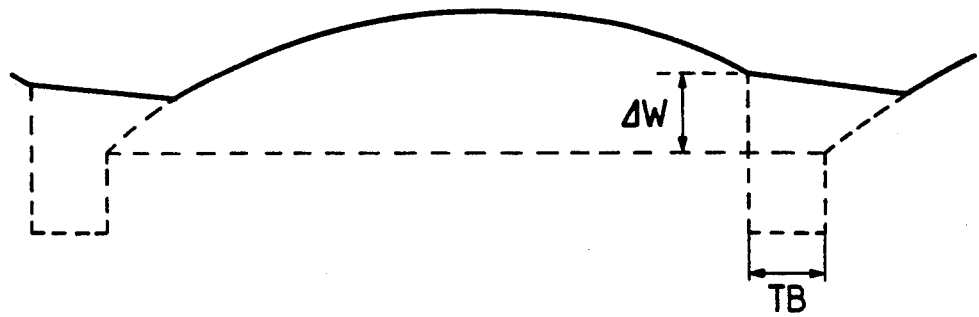
FIG. 10 is a waveform diagram for explaining another problem of the prior art.

FIGS. 3(a) through 3(g) are timing charts useful in explaining the operation of the white level detection circuit thus arranged. FIG. 3(a) shows an image signal waveform output signal of an opto-electric transducing element. FIG. 3(b) shows a waveform of an output signal of differentiation circuit 33. FIG. 3(c) shows a waveform of a set signal S output from comparator circuit 34. FIG. 3(d) shows a waveform of a reset signal R output from comparator circuit 34. FIG. 3(e) shows a waveform of a signal derived from flip-flop 35 and applied to the line 32. FIG. 3(f) shows a variation in the state of sample/hold circuit 31. FIG. 3(g) shows a waveform of a white level signal output from sample/hold circuit 31.

During the white periods W1 and W2, which correspond to white portions which serve as the background of an image, the image signal is relatively large. During the black period B corresponding to the black portion of the surface, the image signal is relatively low, and during the blank period TB of one scan period, the image signal takes the minimum value. "One scan period" means a period taken for electrically scanning a line, or row, of elements such as when an image is read by using a 2-dimensional image sensor. When an image is scanned with a laser beam and light reflected from the surface is detected by a photo diode, the "one scan period" refers to a period taken for the laser beam to scan one image.

The output signal of differentiation circuit 33, which is the derivative of the image signal, takes a large value as indicated by b1 in connection with a steep increase in the image signal when the point to be read is moved from the blank period TB to the white period W1. When the large value exceeds the first threshold level TH1 in comparator circuit 34, comparator 51 outputs a high logic level (set signal S). With the high level signal, flip-flop 35 is set, so that a signal logic "1" is transmitted to the line 32. In sample/hold circuit 31, analog switch 42 becomes conductive to place sample/hold circuit 31 in the sample mode. As indicated by b2 in FIG. 3(g), the white level signal exhibits a variation resembling the image signal. In the sample mode, the white level signal follows the variation of the image signal without any delay.

In the transition from the white period W1 to the black period B and from the white period W2 to the blank period TB, the image signal sharply decreases as indicated by b3 and b4 in FIG. 3(a). At this time, the output signal of differentiation circuit 33 has a large magnitude and a negative polarity. The values of the output signal, denoted as b5 and b6 in FIG. 3(b), are in excess of the second threshold level TH2. As a result, the flip-flop 35 is reset, so that a signal of logic "0" is transmitted to the line 32. The logic "0" signal turns off analog switch 42 in sample/hold circuit 31, to prohibit the image signal from being input. Consequently, the white level signal is held at the signal level retained in the capacitor 43, that is, the signal level (denoted as b7 in FIG. 3(g)) at the end of the previous white period W1. Thus, the image signal processing during the black period B is accurately performed on the basis of the suitable white level signal. Even when the black period B is long, the white level signal remains unchanged, and hence, there is no distortion in the black portion of the image.

Next, operation when the read point is moved from the black period B to the white period W2 is described. In the transition, the sharp increase in the image signal is indicated by b8 in FIG. 3(a). When the output signal of differentiation circuit 33 exceeds the first threshold level TH1, a set signal S is derived from the comparator circuit 34, thereby placing sample/hold circuit 31 in the sample mode. If the image signal is higher than the potential retained in capacitor 43, capacitor 43 is quickly charged. But if the image signal is lower than capacitor 43, capacitor 43 is quickly discharged. FIGS. 3(a) through 3(g) show a case where the image signal during the white period W2 which follows the black period B is smaller than the image signal at the end of the white period W1 which precedes the black period B. In such a case, the white level signal quickly follows the value corresponding to the image signal, as indicated by b9 in FIG. 3(g).

The operation is similarly performed in the transition from the blank period TB to the white period W1. Even when the white level in the initial part of the scan range is different than in the end part thereof, an excellent white level signal may be generated in the respective parts.

As described above, in the present embodiment, a white level signal corresponding to the white portion preceding to the black portion, can be produced for the black image portion. Accordingly, the image signal corresponding to the black portion may be well processed. Even if the white level of the white portion that follows the black portion is lower than the white level of the white portion that was read before the black portion, the white level detection circuit can produce a white level signal accurately following such a low white level. Therefore, the image signal corresponding to the white portion may also be well processed.

In this way, the image signals of both the white and black portions may be processed in a satisfactory manner, thereby improving the performance of reading characters, bar codes, symbols, and other images.

It should be understood that the present invention is not limited to the embodiment as mentioned above, but may be variously modified, changed and altered within the spirit and the scope of the appended claims.

What is claimed is:

1. A white level detection circuit for an optical image reader wherein light, which is reflected from a read surface, is used to generate an electrical image signal by an opto-electric transducing means, said white level detection circuit functioning to generate a white level detection signal which corresponds to a background portion of said read surface, said white level detection circuit comprising:

sample/hold means for receiving said image signal from said opto-electric transducing means and for generating a white level image signal, said sample/hold means operating in either a sample mode in which said sample/hold means produces said white level detection signal based on a variation of said received image signal, or a hold mode in which said white level detection signal generated by said sample/hold means is fixed at a level corresponding to a previously received image signal, and where said sample/hold means operation depends on a control signal; and control means for generating said control signal which places said sample/hold means in the sample mode when the output signal of said opto-electric transducing means sharply increases, and which places said sample/hold means in the hold mode when the output signal of said opto-electric transducing means sharply decreases.

2. The white level detection circuit for an optical image reader according to claim 1, in which said sample/hold circuit comprises:

an input buffer for receiving said image signal from said opto-electric transducing means;

analog switching means for switching said image signal applied through said input buffer;

a capacitor for holding said image signal applied through said analog switch; and an output buffer for producing said output signal in white level detection signal form.

3. A white level detection circuit for an optical image reader wherein light which is reflected from a read surface is used to generate an electrical image signal by an opto-electric transducing means, said white level detection circuit functioning to generate a white level detection signal which corresponds to a background portion in said read surface, said white level detection circuit comprising:

sample/hold means for receiving said image signal from said opto-electric transducing means and for generating a white level image whereby said sample/hold means operating in either a sample mode whereby said sample/hold means generates said white level detection signal based on a variation of said received image signal, or a hold mode whereby said white level image signal generated by said sample/hold means is fixed at the level of a previously received image signal, and where said sample/hold means operation depends on a control signal;

differentiating means for receiving said image signal, for calculating a derivative of said received image signal, and for generating an output signal based on said calculated derivative;

comparing means for receiving said differentiating means output signal and for comparing said received output signal with a positive first threshold level and a negative second threshold level, where said comparing means produces a set signal when said differentiating means output signal exceeds said first threshold level, and where said comparing means produces a reset signal when said differentiating mans output signal falls below said second threshold level; and hold means for outputting a first control signal for placing said sample/hold means in a sample mode in response to said set signal from said comparing means, and for outputting a second control signal for placing said sample/hold means in a hold mode in response to said reset signal from said comparing means.

4. The control means of claim 3, in which said differentiating means comprises a capacitor and a resistor.

5. The control means of claim 3, in which said comparing means is a comparator circuit comprising:

a first comparator means for receiving said positive first threshold level at an inverting input terminal thereof, and for receiving said output signal of said differentiation circuit at a noninverting input terminal thereof, said first comparator generating said set signal output signal for said comparing means when said differentiating means output signal exceeds said positive first threshold level; and a second comparator means for receiving said second negative threshold level at an noninverting input terminal thereof, and for receiving said output signal of said differentiating circuit at an inverting input terminal thereof, said second comparator generating said reset signal output signal for said comparing means when said differentiating means output signal falls below said second threshold level.

* * * * *